Figure 1:
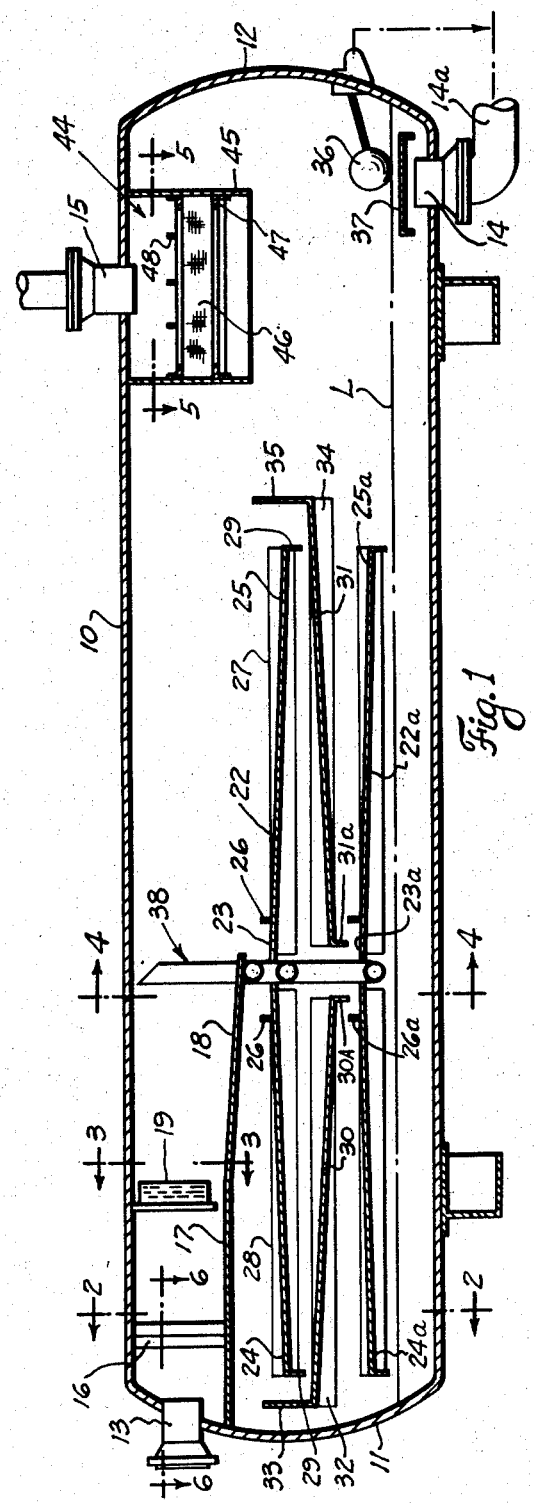

May 19, 1959 R. F. RAY 2,887,174
HORIZONTAL SEPARATORS
Filed Oct. 26, 1956 2 Sheets-Sheet 1

Robert F. Ray
INVENTOR.

BY Vincent Martin
and
Joe E. Edwards
ATTORNEYS

May 19, 1959  R. F. RAY  2,887,174
HORIZONTAL SEPARATORS
Filed Oct. 26, 1956  2 Sheets-Sheet 2

Robert F. Ray
INVENTOR.

BY Vincent Martin
and
Joe E. Edwards
ATTORNEYS

United States Patent Office 2,887,174
Patented May 19, 1959

2,887,174

HORIZONTAL SEPARATORS

Robert F. Ray, Houston, Tex., assignor to Parkersburg-Aetna Corporation, Houston, Tex., a corporation of West Virginia Application October 26, 1956, Serial No. 618,520

10 Claims. (Cl. 183—2.7)

This invention relates to new and useful improvements in horizontal separators.

One object of the invention is to provide an improved horizontal separator which is adapted for use in separating gas from heavy crude oil streams and particularly crude oil streams containing considerable gas in suspension therein.

In effecting the separation of gas from heavy crude oil it has been found desirable to cause the oil to flow through the separator in a relatively thin layer so that the oil is spread over the flow trays to a shallow depth, whereby the entrained gas is thereby given the opportunity to be released from the surface of the oil. It is also desirable to increase the length of the travel path of the oil through the separator because obviously, more efficient separation can be effected if the travel path is increased since this increases the time during which separation of the gas may occur in the separation zone of the apparatus. However, in the case of horizontal type separators, the inherent limitations of a vessel of circular cross-section places a definite restriction on the number of inclined trays which may be employed and prior separators, such as that disclosed in the patent to Glasgow No. 2,586,221, have been limited to a maximum of two flow trays.

It is an important object of this invention to provide an oil and gas separator having an improved flow tray arrangement whereby an increased travel path of the oil through the separator is accomplished which results in increased efficiency of separation of the gas therefrom.

An important object is to provide a horizontal oil and gas separator having flow trays which extend generally in a longitudinal direction within the vessel, with each longitudinal tray being shaped with an inclined section extending from the central portion of the tray to each end thereof, whereby each inclined section of the tray may have the inclination to cause the oil to flow downwardly therealong by gravity while requiring a minimum amount of space vertically within the vessel; the arrangement permitting an increased number of flow trays to be mounted within a given size vessel.

Another object is to provide a separator, of the character described, wherein flat inclined flow trays, which because of their uninterrupted surface are self cleaning, are mounted within the vessel so that the oil flows over the upper surfaces of the trays in a thin uninterrupted layer; the separator also including a suitable foam breaker assembly adjacent the inlet to extract oil from the free gas present in the flowing stream and further including a mist extractor adjacent the gas outlet to remove any entrained moisture from the separated gas leaving the separator vessel.

A further object is to provide an improved mounting for the inclined trays which are mounted within the separator vessel having a circular cross-section.

The construction designed to carry out the invention will be hereinafter described, together with other features thereof.

Figure 5:
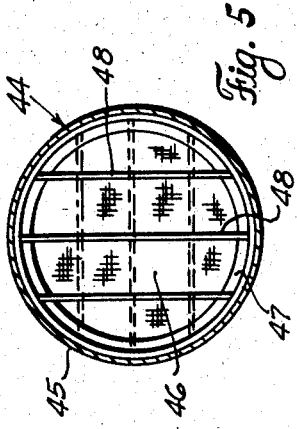
Figure 2:
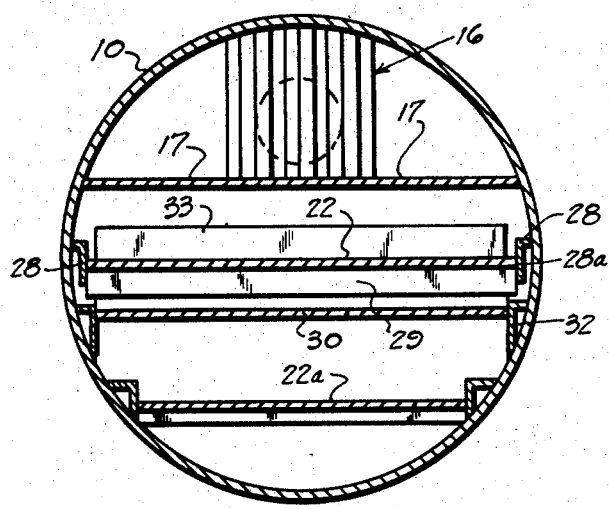
Figure 6:
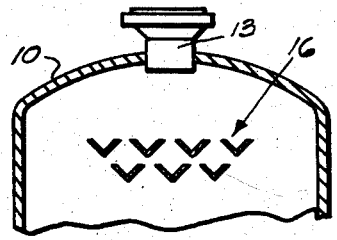
Figure 4:
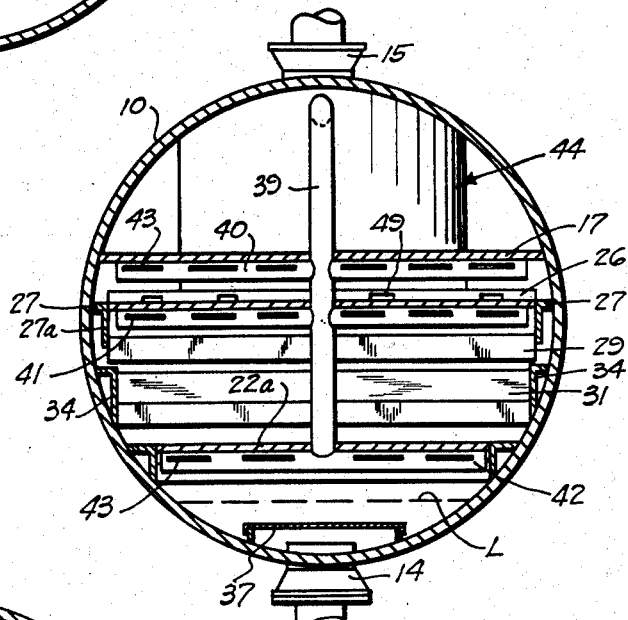
Figure 3:
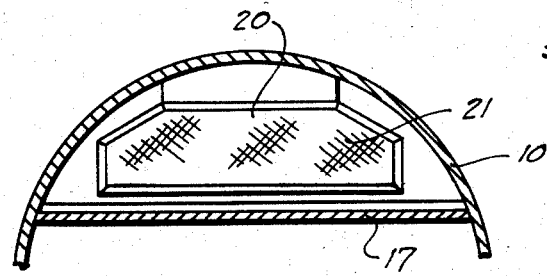

The invention will be more readily understood from a reading of the following specification and by reference to the accompanying drawings forming a part thereof, wherein an example of the invention is shown, and wherein:

Figure 1 is a longitudinal sectional view of a separator, constructed in accordance with the invention, Figure 2 is a transverse, vertical sectional view taken on the line 2—2 of Figure 1, Figure 3 is a transverse, sectional view, taken on the line 3—3 of Figure 1, Figure 4 is an enlarged, transverse sectional view, taken on the line 4—4, Figure 5 is a horizontal, cross-sectional view, taken on the line 5—5 of Figure 1, and Figure 6 is an enlarged horizontal cross-sectional view, taken on the line 6—6 of Figure 1.

In the drawings the numeral 10 designates an elongate, horizontally disposed, cylindrical vessel or tank which has its ends closed by suitable head members 11 and 12 which are welded in position. An inlet collar 13 is mounted in the upper central portion of the vessel or tank, being welded or otherwise secured within the head or closure 11 and the flow stream is conducted into the interior of the vessel through this inlet. An oil outlet 14 is formed in the lower portion of the vessel or tank adjacent the other head 12 thereof and conducts the separated oil from said vessel. A gas outlet 15 is mounted in the top of the tank at that end of the vessel adjacent the head 12 and conducts the separated gas from the interior of the vessel.

For accomplishing a separation of the gas and oil of the incoming well stream, a series of trays are mounted within the vessel between the inlet 13 and the outlets 14 and 15. Referring to Figure 1 the flow stream enters through the inlet 13 and is directed into contact with a deflector assembly 16 which is constructed of a series of staggered, V-shaped bars 17 (Figure 6), and as the stream impinges against the bars or angles 17 the initial velocity of the stream is slowed down and some separation of gas and liquid occurs at this point. Upon entry into the vessel and contact with the deflector assembly the stream is spread over an inlet tray 17. The tray 17 extends from a point below the inlet 13 in a longitudinal direction within the vessel and has its inner end 18 disposed at an incline whereby the stream is caused to flow downwardly by gravity along the tray 17. Beyond the deflector assembly is a foam breaker or coalescing pack 19, and after passing around the deflector assembly, the stream is directed to contact with said foam breaker or pack. The foam breaker is constructed of a housing 20 (Figure 3) which contains a plurality of perforated plates 21, which plates could be sections of expanded metal. Within the foam breaker or coalescing pack the droplets of any free liquid in the stream are removed and any free gas is also given the opportunity to separate.

After passing through the deflector assembly and the foam breaker unit, the flow stream passes downwardly along the inclined portion 18 of the inlet tray and is spread evenly on the upper surface of said tray which extends transversely across the interior of the vessel. The stream flows downwardly from the end of the inlet tray and is deposited upon the central portion of a flow tray 22, which tray is also disposed to extend transversely across the interior of the vessel. As illustrated, the tray 22 has its central portion 23 higher than its end portions 24 and 25 so that the stream, which is deposited upon the central portion of the tray, will flow longitudinally in both directions by gravity along the upper surfaces of the tray 22. It will be evident that that portion of the tray 22 between the central portion and each end forms an inclined section. In order to facilitate the division of the flow which is deposited upon the central portion 23 of the tray 22, upstanding weirs or flanges 26 extend transversely across the tray.

Although the tray 22 may be secured directly to the wall of the vessel, it is evident that because the tray has inclined sections, it would be necessary to vary the transverse width of said tray due to the changing radius of the circular vessel. In order to facilitate formation of the tray and to make mounting thereof economical, a pair of angle bars 27 are secured to the inner wall of the vessel (Figure 2). The vertical leg of the angle bars 27 is of sufficient width or height to accommodate the inclination of the inclined section of the tray 22 which is between the central portion 23 and the end 25 of said tray. A similar pair of mounting angle bars 28 are provided for supporting the inclined section of the tray 22 between the central portion 23 and the end 24.

It might be noted that although a continuous bar 27 and a continuous bar 28 are illustrated as supporting the respective inclined sections, it would be possible to provide a series of angle members along the point at which the tray 22 is to be mounted; in such event the longitudinal edges of each tray would be formed with upturned flanges to prevent spillover of liquid from the sides of the tray.

The ends of the tray 22 are turned downwardly as indicated at 29 and the flow stream is spread in a thin layer as it flows downwardly on the upper surface of the inclined sections of the tray and upon reaching the ends 24 and 25, the stream is deposited upon a second intermediate tray element which has been illustrated as comprising separate trays 30 and 31. The tray 30 is mounted on angle members 32 and underlies that inclined section of the uppermost tray 22 which extends between the central portion and the end 24. The tray 30 is formed with an upstanding flange 33 which projects upwardly above the end of the tray 22.

The other tray 31 of the intermediate tray element is supported by angle bars 34 and underlies that section of the uppermost tray 22 which is between the central portion 23 and the end 25. This tray is formed with an upturned flange 35 which extends above the surface of the tray 22. The intermediate trays 30 and 31 have their adjacent ends formed with downturned flanges 30a and 31a. Although it is desirable from an economic standpoint to form the intermediate tray element of the two trays 30 and 31, this element could be constructed of a single section of material, similar to tray 22 but inverted; in such case, suitable flow opening would be formed at the central portion of the section and a central transversely extending weir would be provided.

Below the intermediate tray element formed by the trays 30 and 31 is another flow tray 22a which is constructed in an identical manner to the tray 22. It has its central portion 23a higher than its ends 24a and 25a and has baffles or weirs 26a adjacent its central portion. It will thus be evident that the flow from the intermediate trays 30 and 31 is directed downwardly onto the lowermost tray 22a and is then directed downwardly along the upper surfaces of the two inclined sections of tray 22a to finally be deposited in the lower portion of the vessel 10.

By the time that the flow stream has traversed the trays 22, 30, 31 and 22a, passing over said trays in a relatively thin layer, the entrained gas has had the opportunity of escaping from the surface of the oil. The separated oil is conducted into the bottom of the vessel or tank 10 and a predetermined level of this oil is maintained at L by a control float 35. In the usual manner the float 35 controls an outlet valve (not shown) which is connected in the outlet line 14a extending from the oil outlet. To prevent excessive vortex at the oil outlet, a suitable shield 36 is provided.

The gas, which is separated from the liquid as it is flowing along the upper surfaces of the trays will, of course, rise upwardly. The gas rising from the inclined section of the uppermost tray 22, which is between the central portion and the end 25, will merely pass into the upper end of the vessel. This is also true of the gas which rises upwardly beneath the intermediate tray 31, the gas merely flowing upwardly along the under surface of the tray, around the flange 35 and into the upper portion of the vessel. Gas, which is separated from the upper surface of the inclined section of the uppermost tray 22 between the central portion of the tray and the end 24, will rise upwardly beneath the inlet tray 17; similarly, some gas, which is separated from the oil as it traverses the intermediate tray and most of the gas rising upwardly from the tray 30 will contact the under side of the central portion of the uppermost tray 22. The gas rising from the maintained liquid level L will tend to rise to the area adjacent the under side of the central portion 23a of the lowermost tray 22a.

For conducting the separated gas from beneath any of the trays where it might accumulate, a gas conduit assembly 38 is provided. This assembly, as is clearly shown in Figure 4, includes a vertical pipe 39 which extends upwardly through the various trays. Lateral pipes 40, 41 and 42 communicate with the vertical pipe 39, which has its upper end open to the upper portion of the vessel or tank 10. Each of the lateral pipes 40, 41 and 42 are formed with slots or openings 43 whereby gas may enter said laterals and then flow to the vertical pipe from where it may escape to the upper end of the vessel. As illustrated the lateral pipe 43 is disposed immediately below the end portion of the inlet tray 17 and conducts any gas accumulating at this point upwardly through pipe 39. The lateral pipe 41 is disposed immediately below the central portion 23 of the uppermost tray 22 and any gas accumulating in this area is also conducted to pipe 39; similarly, the lateral 42 is located immediately below the central portion 23a of the lowermost tray 22a and any gas rising from the liquid which is maintained at the level L in the lower portion of the vessel will pass through the slots or openings 43 in this lateral and will be conducted upwardly to the upper portions of the vessel.

The separated gas which rises into the upper portion of the vessel is caused to pass through a mist extractor 44 which is suitably secured within the vessel adjacent the gas outlet 15. The mist extractor 44 may be of any well known construction, but as illustrated comprises a generally cylindrical housing 45, having a plurality of perforated or mesh-type elements 46 suitably supported therein by angles 47 and transverse bars 48.

The mist extractor functions to remove any entrained liquids which might be present in the gas stream which is discharging through the outlet 15.

The operation of the apparatus is believed obvious from the foregoing. The flow stream, which may be a heavy crude oil, is introduced through the inlet 13, is directed into contact with the deflector assembly 16 and the foam breaker or coalescing pack 19 whereby any free liquids and free gas is separated. The stream having some gas entrained therein then flows downwardly over the inlet tray 17 and, since the tray extends transversely of the vessel is spread in a relatively thin film thereover. From the inlet tray 17, the flow stream is deposited upon the central portion 23 of the uppermost tray 22, and the flow is in effect divided so that substantially one-half of the flow stream passes downwardly along the inclined section between the central portion 23 and the end 24 while the remainder flows downwardly along the other inclined section between the central portion 23 and the end 25. As the stream is spread in a relatively thin layer the separation of the gas, which may be entrained in the heavy oil, is enhanced and encouraged, the gas rising upwardly and the oil continuing its flow over the ends of the uppermost tray 22.

The oil passing from the ends of the uppermost tray falls downwardly onto the intermediate trays 30 and 31 and continues its downward travel through the vessel also in a relatively thin layer whereby further gas separation may occur. From the intermediate trays 30 and 31 the stream is deposited upon a central portion 23a of the lowermost tray 22a and here again flow is in both directions along the tray 22a. By the time that the stream has reached the ends 24a and 25a of the lowermost tray, it has had a sufficient continuous travel through the vessel to substantially separate all of the gas which was entrained in the oil. However, by maintaining a liquid level in the lower portion of the vessel, further gas separation may be accomplished since the gas will rise off of the surface of the level L. The oil is discharged outwardly through the oil outlet 14 while the separated gas is conducted to the upper portion of the vessel, either directly by passing to such upper portion of said vessel or by passing through the conduit assembly 38 which includes the vertical pipe 39 and laterals 40, 41 and 42. The separated gas is then taken through the mist extractor 44 and escapes through the outlet 15 in the upper portion of the vessel.

It is pointed out that the particular tray assembly has been found to give maximum tray surface which provides for a maximum travel path of the flow stream within a given size vessel of circular cross-section. Since it is desirable that the oil pass downwardly in a continuous flow path, it is evident that by constructing the uppermost tray 22 and the lowermost tray 22a with a central portion higher than its ends, the inclination required to effect a flow by gravity will take up less space in a vertical direction than would be the case if the trays 22 and 22a were elongate trays inclining from one end to the other. By upsetting or making the central portion of these trays 22 and 22a higher than their respective ends, the amount of fall or inclination is only about one-half for each section of the tray than would be necessary if a tray of the length of the upper and lower trays 22 and 22a inclined from one end to the other. Therefore, it is possible to mount more trays in a lesser vertical space and the travel path of the flow stream is substantially increased which provides for an increased time during which gas separation may occur. It might be noted that the provision of the transverse baffles 26 and 26a assist in dividing the flow stream to each inclined section of the trays 22 and 22a and the height of these baffles is subject to variation. To prevent the accumulation of any sediment or foreign material between the baffles, said baffles may be provided with a plurality of slots or openings in their lower portions adjacent the tray surface to permit the tray to be self-cleaning. It might also be pointed out that a usual type of float mechanism has been illustrated, but obviously any means for maintaining liquid level at the desired point in the lower portion of the vessel may be employed.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. A horizontal oil and gas separator including, an elongate horizontal vessel of circular cross-section with the longest dimension of the vessel being in a horizontal direction, having an inlet at one end, and an oil outlet and a gas outlet at its opposite end, the interior of the vessel between the inlet and outlets forming a separation zone, an upper flow tray mounted in the vessel and extending longitudinally therein, said tray being shaped to incline downwardly in a longitudinal direction from its central portion to each of its ends whereby inclined sections are formed on each side of the center of said tray, means for depositing the flow stream which enters the inlet upon the central portion of the tray whereby flow occurs in both directions longitudinally of the tray from said central portion, a second tray underlying one inclined section of the first tray and extending longitudinally of the vessel at an inclination opposite to the inclination of the section thereabove, a third tray underlying the other inclined section of the first tray and extending longitudinally opposite to the inclination of the section thereabove, the flow stream flowing downwardly along the inclined sections of the first tray being deposited upon the underlying second and third trays and being spread in a thin layer thereon to permit separation of gas entrained in the stream, means for directing the oil from the second and third trays to the lower end of the vessel, and to the oil outlet, and means for conducting the separated gas to the gas outlet.

2. A horizontal oil and gas separator as set forth in claim 1, together with means for maintaining a predetermined liquid level in the lower portion of the vessel.

3. A horizontal oil and gas separator as set forth in claim 1, together with a fourth flow tray underlying the second and third trays and having its central portion located to receive the flow from the ends of said second and third trays, the fourth tray being shaped to incline downwardly from its central portion to each of its ends whereby inclined sections are formed on each side of the central portion of said tray, the inclination of said sections being in the same direction as the inclination of the inclined sections of the first tray.

4. A horizontal oil and gas separator as set forth in claim 1, together with a fourth flow tray underlying the second and third trays and having its central portion located to receive the flow from the ends of said second and third trays, the fourth tray being shaped to incline downwardly from its central portion to each of its ends whereby inclined sections are formed on each side of the central portion of said tray, the inclination of said sections being in the same direction as the inclination of the inclined sections of the first tray, and means for maintaining a predetermined liquid level in the lower portion of the vessel.

5. A horizontal oil and gas separator as set forth in claim 1, together with a coalescing and foam breaking assembly adjacent the inlet in advance of the first tray for separating the free gas and liquids which are present in the stream, and a mist extractor adjacent and in advance of the gas outlet for removing liquids from the separated gas.

6. A horizontal oil and gas separator as set forth in claim 1, together with a fourth flow tray underlying the second and third trays and having its central portion located to receive the flow from the ends of said second and third trays, the fourth tray being shaped to incline downwardly from its central portion to each of its ends whereby inclined sections are formed on each side of the central portion of said tray, the inclination of said sections being in the same direction as the inclination of the inclined sections of the first tray, the means for depositing the flow stream upon the central portion of the first tray being an inlet tray element mounted within the vessel above said first tray and extending from the inlet to a point overlying the central portion of said first tray.

7. A horizontal oil and gas separator including, an elongate horizontal vessel of circular cross-section with the longest dimension of the vessel being in a horizontal direction, having a flow stream inlet at one end and an oil outlet and a gas outlet at its opposite end, a plurality of longitudinally extending flow trays mounted within the vessel between the inlet and the outlets and disposed in superposed relation with respect to each other, said trays having central portions which are alternately higher and lower than their respective end portions so that longitudinally sloping tray portions are formed whereby the flow stream is caused to traverse the trays in its flow through the separator, a gas escape conduit assembly including a vertically extending pipe extending upwardly through the trays and having its upper end adjacent the upper end of the vessel, and a lateral pipe extending transversely beneath each tray and communicating with the vertical pipe for conducting gas which accumulates below the trays to the vertical pipe from where it may pass into the upper end of the vessel.

8. A horizontal oil and gas separator including, an elongate horizontal vessel of circular cross-section with the longest dimension of the vessel being in a horizontal direction, having a flow stream inlet at one end and an oil outlet and a gas outlet at its opposite end, a plurality of longitudinally extending flow trays mounted within the vessel between the inlet and the outlets and disposed in superposed relation with respect to each other, said trays having central portions which are alternately higher and lower than their respective end portions so that longitudinally sloping tray portions are formed whereby the flow stream is caused to traverse the trays in its flow through the separator, each inclined tray having a substantially straight longitudinal edge portion, and means secured to the inner wall of the vessel and attached to the longitudinal edges of the tray for securing said tray in position within the vessel.

9. A horizontal oil and gas separator as set forth in claim 7, wherein the uppermost flow tray is shaped with its end portions inclined downwardly from its central portion whereby flow may occur in both directions along the tray from said central portion, and means for conducting the flow stream from the inlet to the central portion of said uppermost tray.

10. A horizontal oil and gas separator as set forth in claim 7, wherein the uppermost flow tray is shaped with its end portions inclined downwardly from its central portion whereby flow may occur in both directions along the tray from said central portion, and means for conducting the flow stream from the inlet to the central portion of said uppermost tray, and means for maintaining a predetermined liquid level in the lower portion of the vessel.

References Cited in the file of this patent
UNITED STATES PATENTS

| | | |
|---|---|---|
| 1,907,166 | Williams | May 2, 1933 |
| 2,528,032 | Candler et al. | Oct. 31, 1950 |
| 2,656,896 | Glasgow | Oct. 27, 1953 |
| 2,748,884 | Erwin | June 5, 1956 |